(12) United States Patent
Koefod et al.

(10) Patent No.: US 7,090,882 B2
(45) Date of Patent: Aug. 15, 2006

(54) ANTIMICROBIAL SALT SOLUTIONS FOR FOOD SAFETY APPLICATIONS

(75) Inventors: Robert Scott Koefod, Maple Grove, MN (US); Timothy Freier, Maple Grove, MN (US)

(73) Assignee: Cargill, Incorporated, Minneapolis, MN (US)

( * ) Notice: Subject to any disclaimer, the term of this patent is extended or adjusted under 35 U.S.C. 154(b) by 348 days.

(21) Appl. No.: 10/460,769

(22) Filed: Jun. 12, 2003

(65) Prior Publication Data
US 2004/0253352 A1 Dec. 16, 2004

(51) Int. Cl.
*A23L 1/15* (2006.01)
(52) U.S. Cl. ............... 426/326; 426/327; 426/335; 426/654
(58) Field of Classification Search ........... 426/326, 426/327, 335, 654
See application file for complete search history.

(56) References Cited

U.S. PATENT DOCUMENTS

| | | |
|---|---|---|
| 3,806,615 A | 4/1974 | Frankenfeld et al. |
| 4,002,775 A | 1/1977 | Kabara |
| 4,067,997 A | 1/1978 | Kabara |
| 4,160,820 A | 7/1979 | Wagenknecht et al. |
| 4,189,481 A | 2/1980 | Kabara |
| 4,299,852 A | 11/1981 | Ueno et al. |
| 4,363,763 A | 12/1982 | Peterson |
| 4,469,635 A | 9/1984 | Peterson |
| 4,485,029 A | 11/1984 | Kato et al. |
| 4,539,212 A | 9/1985 | Hunter |
| 4,576,728 A | 3/1986 | Stoddart |
| 4,722,941 A | 2/1988 | Eckert et al. |
| 4,749,508 A | 6/1988 | Cockrell, Jr. et al. |
| 4,749,561 A | 6/1988 | Lane et al. |
| 4,820,449 A | 4/1989 | Menke et al. |
| 4,908,147 A | 3/1990 | Tsao et al. |
| 4,921,694 A | 5/1990 | Hoppe et al. |
| 4,938,953 A | 7/1990 | Pena et al. |
| 5,079,036 A | 1/1992 | Roe et al. |
| 5,093,140 A | 3/1992 | Watanabe |
| 5,208,257 A | 5/1993 | Kabara |
| 5,219,887 A | 6/1993 | Andrews et al. |
| 5,284,833 A | 2/1994 | McAnalley et al. |
| 5,364,650 A | 11/1994 | Guthery |
| 5,378,731 A | 1/1995 | Andrews et al. |
| 5,380,756 A | 1/1995 | Andrews et al. |
| 5,460,802 A | 10/1995 | Asami et al. |
| 5,460,833 A | 10/1995 | Andrews et al. |
| 5,490,992 A | 2/1996 | Andrews et al. |
| 5,520,575 A | 5/1996 | Dickson |
| 5,569,461 A | 10/1996 | Andrews |
| 5,585,028 A | 12/1996 | Berger |
| 5,622,708 A | 4/1997 | Richter et al. |
| 5,632,153 A * | 5/1997 | Ricklefs et al. ............... 62/85 |
| 5,756,107 A | 5/1998 | Hahn et al. |
| 5,792,473 A | 8/1998 | Gergely et al. |
| 5,909,745 A | 6/1999 | Ali et al. |
| 5,968,539 A | 10/1999 | Beerse et al. |
| 5,980,375 A | 11/1999 | Anderson et al. |
| 6,121,215 A | 9/2000 | Rau |
| 6,183,757 B1 | 2/2001 | Beerse et al. |
| 6,190,675 B1 | 2/2001 | Beerse et al. |
| 6,194,370 B1 | 2/2001 | Williams, Jr. et al. |
| 6,197,315 B1 | 3/2001 | Beerse et al. |
| 6,197,738 B1 | 3/2001 | Regutti |
| 6,214,363 B1 | 4/2001 | Beerse et al. |
| 6,214,783 B1 | 4/2001 | Gambogi et al. |
| 6,217,887 B1 | 4/2001 | Beerse et al. |
| 6,231,843 B1 | 5/2001 | Hoelzel et al. |
| 6,284,259 B1 | 9/2001 | Beerse et al. |
| 6,287,577 B1 | 9/2001 | Beerse et al. |
| 6,376,438 B1 | 4/2002 | Rosenberger et al. |

(Continued)

FOREIGN PATENT DOCUMENTS

EP 243 145 10/1987

(Continued)

OTHER PUBLICATIONS

R.E. Wooley, DVM, PhD.: *EDTA-tris Potentiation of Anitmicrobial Agents, Modern Veterinary Practice*, pp. 113-116, Feb. 1983.

(Continued)

*Primary Examiner*—Helen Pratt
(74) *Attorney, Agent, or Firm*—Cargill, Inc.

(57) ABSTRACT

Antimicrobial salt solutions for food safety and quality applications are disclosed. Because these solutions contain a substantial concentration of salt, they are adaptable to a variety of food-processing applications, such as for chilling brine applications, disinfecting meat baths/rinses, beef injection brines, poultry chill tanks, brines used in cheese manufacture, as a wash to kill *salmonella* on hard-boiled eggs, and as a wash to disinfect produce, which can become contaminated with *salmonella* and other pathogenic bacteria in the field. These make use of concentrated salt solutions that depress the freezing point of the solution, to provide a low temperature bath or shower in which food products can be cooled. A preferred formulation contains between 25 ppm and 25,000 ppm surfactant, between 0.1% acid and 25% acid, and between 72.5% and 99.9% salt. This blend can then be dissolved in water to make a solution of between about 1% total solids by weight up to the saturation point, which can be used as an antimicrobial solution for food safety applications. An even more preferred range of solutions would be 17% by weight of between 0.3% and 6.0% citric acid, between 50 and 500 ppm SLS, and between 94% and 99.7% sodium chloride, and can be used in process temperatures of about −6.7° C.

77 Claims, No Drawings

U.S. PATENT DOCUMENTS

| | | | |
|---|---|---|---|
| 6,432,885 B1 | 8/2002 | Vollmer | |
| 6,475,499 B1 | 11/2002 | Maubru et al. | |
| 6,867,233 B1 * | 3/2005 | Roselle et al. | 514/557 |
| 2002/0004464 A1 | 1/2002 | Nelson et al. | |
| 2002/0098210 A1 | 7/2002 | Hahn et al. | |
| 2002/0182267 A1 | 12/2002 | Kleinberg et al. | |
| 2003/0176500 A1 | 9/2003 | Molly et al. | |

FOREIGN PATENT DOCUMENTS

| | | | |
|---|---|---|---|
| EP | 244 144 | | 11/1987 |
| EP | 312 519 | | 4/1989 |
| EP | 368 622 | | 5/1990 |
| EP | 530 861 | | 3/1993 |
| EP | 633 767 | | 1/1995 |
| EP | 670 160 | | 9/1995 |
| EP | 713 096 | | 5/1996 |
| EP | 874 988 | | 11/1998 |
| EP | 891 711 | | 1/1999 |
| WO | 88/00463 | | 1/1988 |
| WO | 92/21320 | | 12/1992 |
| WO | 93/00100 | | 1/1993 |
| WO | 93/19154 | | 9/1993 |
| WO | 93/19159 | | 9/1993 |
| WO | 94/09106 | | 4/1994 |
| WO | 95/07616 | * | 3/1995 |
| WO | 95/32705 | | 12/1995 |
| WO | 96/19181 | | 6/1996 |
| WO | 97/22878 | | 6/1997 |
| WO | 98/09520 | | 3/1998 |
| WO | 98/55093 | | 12/1998 |
| WO | 98/55095 | | 12/1998 |
| WO | 99/20729 | | 4/1999 |
| WO | 99/36494 | | 7/1999 |
| WO | 99/66020 | | 12/1999 |
| WO | 00/01238 | | 1/2000 |
| WO | 00/22082 | | 4/2000 |
| WO | 00/30460 | | 6/2000 |
| WO | 00/61105 | | 10/2000 |
| WO | 00/71183 | | 11/2000 |
| WO | 01/16267 | | 3/2001 |
| WO | 01/43549 | | 6/2001 |
| WO | 01/55287 | | 8/2001 |
| WO | 02/15809 | | 2/2002 |
| WO | 02/24845 | | 3/2002 |
| WO | 02/50223 | | 6/2002 |

OTHER PUBLICATIONS

Rachel Schemmel, et al.: *Monolaurin as an Anticaries Agent, Symposium on the Pharmacological Effect of Lipids*, St. Louis, The American Oil Chemist's Society, Champaign, Illinois, p. 37.

Nobuyuki Kato, et al.: *Combined Effect of Citric and Polyphosphoric Acid on the Antibacterial Activity of Monoglycerides*, pp. 2-9, Apr. 10, 1976.

Nobuyuki Kato, et al.: *Combined Effect of Different Drugs on the Antibacterial Activity of Fatty Acids and Their Esters*, pp. 1-7, Sep. 25, 1975.

Rachel Schemmel, et al.: *Monolaurin as an Anticaries Agent, Symposium on the Pharmacological Effect of Lipids*, St. Louis, The American Oil Chemist's Society, Champaign, Illinois, p. 37. (Date not available).

* cited by examiner

ANTIMICROBIAL SALT SOLUTIONS FOR FOOD SAFETY APPLICATIONS

BACKGROUND OF THE INVENTION

1. Field of the Invention

This invention relates to antimicrobial solutions for food safety and quality applications. The prevention of contamination of food product by pathogenic microorganisms is important to protect public health. The reduction of spoilage microorganisms in food manufacturing facilities can extend product shelf lives and reduce the amount of food that is discarded as waste. There is a need for improved methods of controlling microorganisms in food production plants. Bacteria, yeast and molds can accumulate at a variety of different points in a food manufacturing operation; the more points at which viable microorganisms can be controlled, the lower the chances of food contamination and the safer the manufacturing process.

The invention described herein is a food-safe solution than may be used in a variety of applications to control microorganisms in food plant operations, including the disinfection of food processing equipment as well as disinfection of the food product itself. The invention consists of a mixture of a salt, such as sodium chloride, with an acid and a surfactant, such as sodium lauryl sulfate. Suitable acids include citric, malic, acetic, propionic, lactic, benzoic, ascorbic, isoascorbic, sorbic, phosphoric, hydrochloric, malic, tartaric, adipic, succinic, glutaric, salicylic, and sulfuric acids as well as sodium bisulfate. The salt can be selected from inorganic salts including the sodium, potassium, magnesium, calcium, iron, and ammonium salts of chloride, sulfate, nitrate, phosphate, carbonate, and hydroxide. Suitable surfactants include sodium lauryl sulfate, linear alkylbenzene sulfonates, alcohol sulfates, alpha-olefin sulfonates, alcohol ethoxylates, nonylphenyl ethoxylates, alkylpolyglucosides, fatty alkanoamides, fatty amine oxides, sodium dioctylsulfosuccinate, dodecylbenzene sulfonic acid and its salts, the sodium salt of sulfonated oleic acid, sodium dodecylbenzene sulfonate, and dodecyldiphenyloxide-disulfonic acid and its salts.

A preferred formulation contains between 25 ppm and 25,000 ppm surfactant, between 0.1% acid and 25% acid, and between 72.5% and 99.9% salt. This blend can then be dissolved in water to make a solution ranging in concentration from about 1% total solids by weight up to the saturation point, which can be used as an antimicrobial solution for food safety applications.

2. Description of Prior Art

The use of acids and surfactants as antibacterial agents is known. These cannot be used in environments where operation at low temperature is required, as their effectiveness drops off significantly at lower temperature and, of course, operation below 0° C. is typically prevented by freezing.

Other antibacterial agents have been identified, but their use is problematic due to their non-food quality status. For example, a wide variety of chemical disinfecting agents are in use in food plants. However, there are often disadvantages to these chemicals. In some instances they are too toxic to come into direct contact with the food itself, and many present worker safety or environmental waste disposal issues. In other instances they are insufficiently effective to provide adequate kill of microorganisms, especially at low temperatures. Additionally, the relatively high cost of these chemicals adds to the cost of food production and, consequently, increases the cost of the end product itself.

Salt has been used for thousands of years as a food preservative. Generally, however, salt solutions alone are not sufficiently effective as antibacterial agents, as they do not provide a speedy mechanism for killing unwanted bacteria that permits their exclusive use in food processing environments.

Thus, a problem associated with the antimicrobial solutions for food safety applications that precede the present invention is that they do not provide an improved antimicrobial solution for food safety applications having operating parameters adaptable to a multiplicity of applications in the food processing industry.

Another problem associated with the antimicrobial solutions for food safety applications that precede the present invention is that they do not provide an antimicrobial solution for food safety applications having safe, acceptable ingredients for use in food processing to prevent bacteria from accumulating in food processing operations.

Yet another problem associated with the antimicrobial solutions for food safety applications that precede the present invention is that they do not provide an antimicrobial solution for food safety applications that can be used at temperatures below room temperature, and preferably below the normal freezing point of water (0° C.).

Still a further problem associated with the antimicrobial solutions for food safety applications that precede the present invention is that they may contain or lead to toxic and/or environmentally undesirable additives. For example, they may contain quaternary ammonium chloride as the anti-bacterial ingredient, or they may form chlorinated or brominated byproducts, or they may contain phosphates.

Yet another problem associated with the antimicrobial solutions for food safety applications that precede the present invention is that they do not provide an antimicrobial solution for food safety applications that is relatively inexpensive to purchase, use and maintain.

For the foregoing reasons, there has been defined a long felt and unsolved need for antimicrobial solutions for food safety applications that are comparatively inexpensive to use and maintain and are adaptable to accommodate a variety of operating conditions. In contrast to the foregoing, the present invention constitutes antimicrobial solutions for food safety applications that seek to overcome the problems discussed above while at the same time providing a simple, relatively easily implemented treatment and method that is readily adapted to a variety of applications.

SUMMARY OF THE INVENTION

Early screening tests of a preferred embodiment revealed an unexpected, synergistic effect between sodium chloride and the acid/SLS (sodium lauryl sulfate) antimicrobial additive. Replicate tests were run to determine if this effect was significant. Solutions were also prepared containing an identical concentration of acid and SLS but no sodium chloride. Results of these tests run with multiple replicates illustrate that for both the citric acid/SLS and malic acid/SLS additives, the number of microorganisms remaining alive after 30 minutes is much lower when salt is present than when there is no salt present.

It is therefore an object of the present invention is to provide an improved antimicrobial solution for food safety applications.

Another object of the present invention is to provide an antimicrobial solution for food safety applications having acceptable ingredients for use in food processing to prevent microorganisms from accumulating in food processing operations.

Yet another object of the present invention is to provide an antimicrobial solution for food safety applications that can be used at temperatures below room temperature, and preferably below the normal freezing point of water (0° C.).

Still a further object of the present invention is to provide an antimicrobial solution for food safety applications that does not rely on the presence of generally toxic or hazardous chemicals as the anti-microbial ingredient.

Still a further object of the present invention is to provide an antimicrobial solution for food safety applications that is relatively inexpensive to purchase, use and maintain.

For the foregoing reasons, there has been defined a long felt and unsolved need for an improved antimicrobial solution for food safety applications. The present invention provides an antimicrobial solution for food safety applications that seeks to overcome the problems discussed above.

DETAILED DESCRIPTION OF PRESENTLY PREFERRED EMBODIMENTS

The use of acids and surfactants as antibacterial agents is known. Salt has also been used for thousands of years as a food preservative. However, it has been discovered that inorganic salts act synergistically with the acid/surfactant ingredients to provide a significant and unexpected increase in their antibacterial effectiveness.

Early screening tests indicated that there was an unexpected synergistic effect between sodium chloride and the acid/SLS (sodium lauryl sulfate) antibacterial additive. Replicate tests were run to determine if this effect was statistically significant. Ten percent by weight solutions were prepared of a formula of 0.6% citric or malic acid, 100 ppm SLS, and 99.4% sodium chloride. Solutions were also prepared containing an identical concentration of acid and SLS but no sodium chloride. A bacterial culture suspension (*Escherichia coli* ATCC 11229) that had been incubated for 24 hours in Brain Heart Infusion (BHI) broth and had an initial inoculum count of about $10^9$ CFU/ml was serially diluted in cold Butterfield's Phosphate Buffered Water (BPBW) to $10^5$ CFU/ml. A 1.0 ml aliquot of this suspension was added to 100 ml of test solution at room temperature and mixed well, providing an initial inoculum of $10^3$ CFU/ml. After 30 minutes, the *E. coli* populations were enumerated by plating on tryptic soy agar (TSA), making serial dilutions as necessary in BPBW. Plates were incubated at 35° C.+/−2° C. for approximately 24 hours. Colonies were then counted and compared to the initial inoculum counts. Results of these tests run on 16 replicates of each test solution are given in Table 1.

TABLE 1

| Effectiveness of Acid/SLS Solutions with and without Salt on *E. coli* | |
|---|---|
| Test Solution | Average Conc. of *E. Coli* (CFU/ml) |
| citric acid, SLS, with salt | 540 |
| citric acid, SLS, without salt | 1054 |
| malic acid, SLS, with salt | 141 |
| malic acid, SLS, without salt | 2419 |

It can be seen that for both the citric acid/SLS and malic acid/SLS additives, the number of bacteria remaining alive after 30 minutes is much lower when salt is present than when there is no salt present. Analysis of the data indicates that there is a statistically significant increase in kill in the presence of salt ($p<0.05$). In contrast, a 10% solution of pure sodium chloride does not provide any significant kill of the test microorganisms.

The fact that these formulas contain a substantial concentration of salt makes them ideal for a variety of applications. For instance, they are ideal for chilling brine applications. Chilling brines make use of concentrated salt solutions that depress the freezing point of the solution to provide a low temperature bath or shower in which food products can be efficiently cooled. Bacterial contamination of the chill brine is a food safety hazard, requiring that the brine be frequently disposed and often requiring rigorous cleaning of the equipment to remove bacterial biofilms. Contamination by *Listeria monocytogenes* is of particular concern in many ready-to-eat meat, poultry, seafood and dairy processing chill brine applications because it is known to survive in high salt concentrations and because many of the currently available disinfectant chemicals are either not suitable for direct food contact or become ineffective at the cold temperatures of the chill bath. Brine chillers are used extensively to cool frankfurters and other sausage products in continuous-cook operations. Dozens of nationwide recalls and at least one large food-borne outbreak have been caused by *L. monocytogenes* contamination of these types of products.

Tests were run on 17% by weight solutions of formulas consisting of between 0.3% and 6.0% citric acid, between 50 and 500 ppm SLS, and between 94% and 99.7% sodium chloride. Test solutions were cooled to −6.7° C. and inoculated with several strains of *L. monocytogenes*. Within 4 hours most solutions showed a 3 log kill of microorganisms and within 24 hours nearly all solutions showed 100% kill of the inoculum. A brine solution made up of sodium chloride alone caused less than a 1 log reduction of the *L. monocytogenes* over a 24-hour period.

Many applications for these formulas are envisioned. One application is for a disinfecting meat bath/rinse. Bacterial contamination during slaughter is typically highest at the surface of the meat, and these solutions may be used as a method to kill bacteria directly on the meat surface in a manner that is food safe and will impart no toxic chemicals to the meat. A solution of the antimicrobial salt could be sprayed or showered on to animal carcasses or the carcasses could be directly immersed in a bath of the solution. The brine could be pre-chilled to provide a simultaneous cooling and disinfection. The antimicrobial brine can also be used to wash animals prior to slaughter, to minimize contamination from the animals' hides, skins or feathers. It can also be used as a disinfection wash/chill step for beef trim.

Another application for this invention is for beef injection brines. Brines are injected into enhanced beef products, and there is concern that the brine may drive bacteria, such as *E. coli* O157:H7, from the surface into internal areas of the meat. Cooking intact cuts of beef to rare or medium-rare doneness could then lead to food-bone illness. Another concern is that the brine, which is recycled in the process, will become contaminated. Under the current regulatory environment, it is crucial that beef processors are able to prove lot-to-lot separation. Use of a validated antimicrobial in the injected brine solution could prevent the brine injection system from tying together multiple production lots. Other potential uses in the meat industry include hide curing, offal chilling and natural casing preservation.

In the poultry industry, contamination of the carcasses by *Salmonella* spp. and *Campylobacter* spp. is a major public health concern. An antimicrobial salt solution could be used in poultry chill tanks to reduce this contamination and provide an energy-efficient cooling step, thus improving product shelf life and quality.

Brines used in cheese manufacture present another application for this invention. Cheese manufacture often involves a prolonged soak in concentrated brine. This step can introduce a significant risk for *L. monocyotogenes* contamination. This risk could be minimized through the use of an antimicrobial salt solution in the brine.

Yet another application is as a wash to kill *salmonella* on eggs. Also, hard-boiled eggs are often pre-disinfected and shipped in brine. Use of these formulas would permit the disinfection step to be carried out in the storage brine itself. Yet another application is a wash to disinfect produce, which can become contaminated with *salmonella* and other pathogenic bacteria in the field.

The following examples further illustrate the synergistic and unexpected results from combining acid/surfactant with salt. An experiment was run to determine if solutions containing sodium chloride, sodium lauryl sulfate, and various acids would kill *L. monocytogenes* at cold temperatures. The following test procedure was used: A bacterial culture suspension (*L. monocytogenes* H2446 [CDC Global Standard]; Scott A-serotype 4b; 12243-serotype 1/2a; and a recent cooked meat and poultry facility isolate, WP4) that had been incubated for at least 5 days in BHI broth and had an initial inoculum count of about $10^9$ CFU/m was serially diluted in cold BPBW to $10^5$ CFU/ml. A 1.0 ml aliquot of this suspension was added to 100 ml of cold (−7° C.+/−2° C.) test solution and mixed well, providing an initial incoculum of $10^3$ CFU/ml. The test solutions were incubated at −7° C.+/−2° C. for the duration of the experiment. At intervals of 0, 4, and 24 hours the *L. monocytogenes* populations in the test solutions were determined on Modified Oxford agar (MOX). MOX plates were incubated at 35° C.+/−2° C. for approximately 48 hours. Colonies were then counted and compared to the initial inoculum counts.

Results are given in Table 2. Each test solution was a 17% by weight solution of the listed formula prepared in soft water.

TABLE 2

Effect of Solutions of NaCl, SLS and various acids on *L. monocytogenes*

| Sample | Time 0 CFU/ml | 4 hr CFU/ml | 24 hr CFU/ml | pH | Water Activity |
|---|---|---|---|---|---|
| 100% NaCl | 1550 | 1250 | 1170 | 7.88 | 0.88 |
| 2.0% Malic Acid, 500 ppm SLS, 98.0% NaCl | 0 | 0 | 0 | 1.21 | ND |
| 5.0% Na Bisulfate, 500 ppm SLS, 95.0% NaCl | 0 | 0 | 0 | 0.81 | 0.883 |
| Water Control | 1270 | 400 | 0 | 9.34 | 0.999 |
| 0.3% Malic Acid, 100 ppm SLS, 99.7% NaCl | 480 | 5 | 0 | 4.1 | ND |
| 0.5% Malic Acid, 100 ppm SLS, 99.5% NaCl | 176 | 0 | 0 | 3.31 | ND |
| 0.7% Malic Acid, 100 ppm SLS, 99.3% NaCl | 117 | 0 | 0 | 2.99 | 0.88 |
| 0.3% Citric Acid, 500 ppm SLS, 99.7% NaCl | 5 | 0 | 0 | 4.14 | ND |
| 0.5% Citric Acid, 500 ppm SLS, 99.5% NaCl | 0 | 0 | 0 | 3.37 | ND |
| 0.7% Citric Acid, 500 ppm SLS, 99.3% NaCl | 0 | 0 | 0 | 2.98 | 0.88 |
| 0.3% Malic Acid, 500 ppm SLS, 99.7% NaCl | 11 | 0 | 0 | 4.15 | ND |
| 0.5% Malic Acid, 500 ppm SLS, 99.5% NaCl | 3 | 0 | 0 | 3.39 | ND |
| 0.7% Malic Acid, 500 ppm SLS, 99.3% NaCl | 0 | 0 | 0 | 3.06 | 0.879 |
| 1.0% Citric Acid, 500 ppm SLS, 99.0% NaCl | 0 | 0 | 0 | 2.69 | ND |
| 1.0% Malic Acid, 500 ppm SLS, 99.0% NaCl | 0 | 0 | 0 | 2.81 | ND |
| 2.0% Lactic Acid, 500 ppm SLS, 98.0% NaCl | 0 | 0 | 0 | 2.65 | 0.885 |
| 2.0% Phosphoric Acid (75%), 500 ppm SLS, 98.0% NaCl | 0 | 0 | 0 | 1.52 | 0.884 |
| 1.0% Benzoic Acid, 500 ppm SLS, 99.0% NaCl | 0 | 0 | 0 | 3.93 | 0.879 |
| 2.0% Citric Acid, 500 ppm SLS, 98.0% NaCl | 0 | 0 | 0 | 2.3 | 0.884 |
| 2.0% Malic Acid, 500 ppm SLS, 98.0% NaCl | 0 | 0 | 0 | 2.46 | 0.882 |

In another experiment, 17% by weight solutions of formulas containing various levels of sodium chloride, citric acid, and sodium lauryl sulfate were tested for effectiveness in killing *L. monocytogenes* at cold temperatures. The same test procedure was used as described above, except test solutions were plated on MOX with a Thin Agar Overlay of TSA (to aid in the recovery of injured cells). Results are given in Table 3. The data indicate that the relative amounts of acid and surfactant can be varied to suit different applications. In pH sensitive applications, the acid may be decreased without losing effectiveness if the level of surfactant is increased. Similarly, in applications where a lower level of surfactant is desired, the performance can be maintained by raising the concentration of acid.

TABLE 3

Effect of Solutions of NaCl, SLS, and Citric Acid on *L. monocytogenes* at −6.7° C.

| Sample | Time 0 CFU/ml | 4 hr CFU/ml | 24 hr CFU/ml | pH |
|---|---|---|---|---|
| 100% NaCl | ~7000 | ~6250 | 2290 | 7.66 |
| 0.3% Citric Acid, 50 ppm SLS, 99.7% NaCl | ~4940 | 163 | 0 | 4.19 |
| 0.3% Citric Acid, 100 ppm SLS, 99.7% NaCl | 2230 | 97 | 0 | 4.27 |
| 0.3% Citric Acid, 150 ppm SLS, 99.7% NaCl | 3080 | 105 | 0 | 4.3 |
| 0.3% Citric Acid, 200 ppm SLS, 99.7% NaCl | 1970 | 42 | 0 | 4.28 |
| 0.3% Citric Acid, 300 ppm SLS, 99.7% NaCl | 1490 | 20 | 0 | 4.3 |
| 0.3% Citric Acid, 400 ppm SLS, 99.7% NaCl | 221 | 1 | 0 | 4.29 |
| 0.3% Citric Acid, 500 ppm SLS, 99.7% NaCl | 99 | 0 | 0 | 4.32 |
| 0.5% Citric Acid, 50 ppm SLS, 99.5% NaCl | 3360 | 0 | 0 | 3.54 |
| 0.5% Citric Acid, 100 ppm SLS, 99.5% NaCl | 3180 | 1 | 0 | 3.54 |
| 0.7% Citric Acid, 50 ppm SLS, 99.3% NaCl | 3710 | 0 | 0 | 3.14 |
| 0.7% Citric Acid, 100 ppm SLS, 99.3% NaCl | 1020 | 0 | 0 | 3.13 |
| 1.0% Citric Acid, 50 ppm SLS, 99.0% NaCl | 1840 | 0 | 0 | 2.82 |
| 1.0% Citric Acid, 100 ppm SLS, 99.0% NaCl | 970 | 0 | 0 | 2.82 |
| 2.0% Citric Acid, 50 ppm SLS, 98.0% NaCl | 114 | 0 | 0 | 2.41 |
| 2.0% Citric Acid, 100 ppm SLS, 98.0% NaCl | 479 | 0 | 0 | 2.41 |
| 4.0% Citric Acid, 50 ppm SLS, 96.0% NaCl | 6 | 0 | 0 | 2.12 |
| 4.0% Citric Acid, 100 ppm SLS, 96.0% NaCl | 1 | 0 | 0 | 2.12 |
| 6.0% Citric Acid, 50 ppm SLS, 94.0% NaCl | 1 | 0 | 0 | 1.99 |

In another experiment, two sets of solutions were tested. The first set (samples 1–12 in Table 4 below) was prepared in hard tap water and contained about 17.0% by mass of the formulation. These samples were inoculated with $10^3$ CFU/ml *L. monocytogenes* by the same procedure as described above. A second set of samples was prepared from brine taken from a ready-to-eat meat processing operation. The recirculated brine had been used to chill packaged meat for one week. After a week of use the brine typically contains various types of aerobic psychrotrophic and mesophilic bacteria. This experiment was done in order to determine if the additives would kill the microorganisms naturally occurring in actual process brine from a plant. Since the spent chill brine samples already contained NaCl, citric acid and/or SLS was added to provide an effective concentration of additive. One set of these samples (samples 13–17) were inoculated with $10^3$ *L. monocytogenes* and the other set (samples 18–22) contained only the naturally occurring organisms in the spent chill brine. Results are given in Table 4 below. The data indicate that at lower acid levels, the SLS increases the effectiveness of the mixture, but at higher acid levels, the SLS is not necessary. The results show the formulations are effective in hard water. The results also demonstrate that the formulations effectively kill *L. monocytogenes* as well as the naturally occurring microorganisms in spent chill brine from an actual meat processing plant.

TABLE 4

Effects of Antimicrobial Salt Formulas in Hard Water and in Spent Chill Brine

| Sample | Time 0 cfu/ml | 2 hr cfu/ml | 24 hr cfu/ml |
|---|---|---|---|
| 100% NaCl | 760 | 1100 | 1100 |
| 0.3% Citric Acid, 100 ppm SLS, 99.7% NaCl | 730 | 670 | 29 |
| 0.3% Citric Acid, 99.7% NaCl | 1460 | 1330 | 830 |
| 0.5% Citric Acid, 100 ppm SLS, 99.5% NaCl | 890 | 240 | 0 |
| 0.5% Citric Acid, 99.5% NaCl | 1060 | 1170 | 330 |
| 0.7% Citric Acid, 100 ppm SLS, 99.3% NaCl | 1010 | 14 | 0 |
| 0.7% Citric Acid, 99.3% NaCl | 1040 | 1030 | 3 |
| 1.0% Citric Acid, 100 ppm SLS, 99.0% NaCl | 840 | 0 | 0 |
| 1.0% Citric Acid, 99.0% NaCl | 990 | 340 | 0 |
| 2.0% Citric Acid, 98.0% NaCl | 910 | 0 | 0 |
| 4.0% Citric Acid, 96.0% NaCl | 1110 | 0 | 0 |
| 6.0% Citric Acid, 94.0% NaCl | 950 | 0 | 0 |
| Brine Control with *L. mono* | 1260 | 1290 | 600 |
| 1% Citric Acid in Brine with *L. mono* | 1050 | 0 | 0 |
| 2% Citric Acid in Brine with *L. mono* | 1140 | 0 | 0 |
| 1% Citric Acid + 50 ppm SLS in Brine with *L. mono* | 1090 | 0 | 0 |
| 2% Citric Acid + 50 ppm SLS in Brine with *L. mono* | 1070 | 0 | 0 |
| Brine Control | 6000 | 3100 | 2000 |
| 1% Citric Acid in Brine | 2490 | 190 | 4 |
| 2% Citric Acid in Brine | 1670 | 6 | 0 |
| 1% Citric Acid + 50 ppm SLS in Brine | 2520 | 122 | 0 |
| 2% Citric Acid + 50 ppm SLS in Brine | 1480 | 6 | 0 |

A test was run to determine if salts other than sodium chloride would show a synergistic antimicrobial effect with an acid and sodium lauryl sulfate. Solutions containing 0.6409 grams malic acid and 0.0107 grams sodium lauryl sulfate per liter were prepared with and without 107.0 grams of various salts (added on an anhydrous basis). Solutions were inoculated with *E. coli* as described above and the amount of bacterial kill was measured to determine if the added salt caused an increase in the effectiveness of the acid/surfactant active ingredients. Results are shown in Table 5.

TABLE 5

Effect of Different Salts on the Antimicrobial Action of Malic Acid/SLS

| Solution (salt added) | % Kill of *E. Coli* |
|---|---|
| No salt addition | 4.4% |
| Sodium sulfate | 87% |
| Magnesium chloride | 56% |
| Potassium chloride | 18% |
| Sodium chloride | 78% |
| Potassium sulfate | 34% |
| Calcium chloride | 55% |
| Magnesium sulfate | 93% |

Tests run on solutions containing only the salt and no other ingredient indicate that sodium sulfate, potassium chloride and potassium sulfate provide no bacterial kill. Magnesium chloride solution provided 61% kill, calcium chloride provided 26% kill, and magnesium sulfate provided 10% kill. Thus, based on the data developed thus far, sodium sulfate, sodium chloride, and magnesium sulfate appear to significantly increase the effectiveness of the acid/surfactant antimicrobial agent, even though the salts provide little kill on their own.

The effectiveness of antimicrobial salt formulas was tested against *L. monocytogenes* in a biofilm. Stainless steel coupons (2×5 cm, type 302 stainless steel, 2B finish) were cleaned in acetone followed by an alkaline detergent and distilled water and then dried in an autoclave at 121° C. for 15 minutes. A culture of *L. monocytogenes* (Scott A-serotype 4b) was prepared by inoculating 10 mL of TSA and incubating overnight at 35° C. 50 mL of sterile TSA+0.6% yeast extract (YE) was aseptically dispensed into sterile disposable conical shaped plastic tubes and one drop of overnight grown *L. mono* culture was added to each tube. Inoculated tubes were incubated at 25° C. for approximately 48 hours. After the biofilm had formed on the coupons, a coupon was aseptically removed from the tube and gently rinsed with distilled water to remove unattached cells. Coupons were then immersed in cold antimicrobial test solution (~6.7° C.) and incubated over different time intervals (1 hour, 24 hours, and 5 days). After incubation period, the coupon was shaken in a tube containing 40 mL of sterile PBW and 10 sterile glass beads (4 mm) for 2 minutes two remove the cells attached to the coupon biofilm. The cells were plated in the PBW on TSA+0.6% YE using appropriate dilutions and incubated at 35° C. for 48 hours.

Results on triplicate samples of antimicrobial test solutions are given in Table 6 below. Each solution contained 17% by weight of a formula consisting of the percentages of citric acid and SLS listed in Table 6, with the balance of the formula being NaCl in each case. The data indicate that not only are the antimicrobial salt solutions effective at killing bacteria suspended in solution, they are also effective at killing bacteria within a biofilm.

TABLE 6

Log Concentration of *L. mono* in Antimicrobial Salt Solutions

| Sample | 1 Hour | 24 Hours | 5 days |
|---|---|---|---|
| 0.3% citric acid, 100 ppm SLS | ~5.08 | 4.59 | 1.38 |
| 0.3% citric acid, 100 ppm SLS | ~4.90 | 3.85 | 1.79 |
| 0.3% citric acid, 100 ppm SLS | ~4.81 | 3.48 | 1.92 |
| 0.3% citric acid, 500 ppm SLS | 4.81 | 4.76 | 2.23 |
| 0.3% citric acid, 500 ppm SLS | 4.90 | 3.48 | 2.18 |
| 0.3% citric acid, 500 ppm SLS | ~5.18 | 3.48 | 2.36 |
| 0.7% citric acid, 100 ppm SLS | 1.88 | 0 | 0 |
| 0.7% citric acid, 100 ppm SLS | 2.02 | 0 | 0 |
| 0.7% citric acid, 100 ppm SLS | 1.28 | 0 | 0 |
| 0.7% citric acid, 500 ppm SLS | 0.70 | 1.00 | 0.90 |
| 0.7% citric acid, 500 ppm SLS | 0.90 | 0.70 | 0.30 |
| 0.7% citric acid, 500 ppm SLS | 0.85 | 0 | 0 |
| 2.0% citric acid, 100 ppm SLS | 0 | 0 | ND |
| 2.0% citric acid, 100 ppm SLS | 0 | 0 | ND |
| 2.0% citric acid, 100 ppm SLS | 0 | 0 | ND |
| 2.0% citric acid, 500 ppm SLS | 0 | 0 | ND |
| 2.0% citric acid, 500 ppm SLS | 0 | 0 | ND |
| 2.0% citric acid, 500 ppm SLS | 0 | 0 | ND |
| 6.0% citric acid, 100 ppm SLS | 0 | 0 | ND |
| 6.0% citric acid, 100 ppm SLS | 0 | 0 | ND |
| 6.0% citric acid, 100 ppm SLS | 0 | 0 | ND |
| 6.0% citric acid, 500 ppm SLS | 0 | 0 | ND |
| 6.0% citric acid, 500 ppm SLS | 0 | 0 | ND |
| 6.0% citric acid, 500 ppm SLS | 0 | 0 | ND |
| 12.0% citric acid, 100 ppm SLS | 0 | 0 | ND |
| 12.0% citric acid, 100 ppm SLS | 0 | 0 | ND |
| 12.0% citric acid, 100 ppm SLS | 0 | 0 | ND |
| 12.0% citric acid, 500 ppm SLS | 0 | 0 | ND |
| 12.0% citric acid, 500 ppm SLS | 0 | 0 | ND |
| 12.0% citric acid, 500 ppm SLS | 0 | 0 | ND |
| Salt Control A | ~5.04 | ~7.15 | 7.65 |
| Salt Control B | ~5.48 | ~7.15 | 7.42 |
| Salt Control C | ~5.48 | ~7.11 | 7.65 |
| Water Control | ~5.18 | ~7.18 | 7.54 |

Another set of experiments was done in order to determine the effectiveness of different acids and different types of surfactants in the antimicrobial salt formulations. In one experiment, test solutions containing 17% by weight of formulas containing various levels of sodium chloride, 100 ppm sodium lauryl sulfate, and various levels of different acids were tested for effectiveness in killing *L. monocytogenes* at cold temperatures. The same test procedure was used as described above (test solutions were plated on MOX TAL (Modified Oxford Medium with a Thin Agar Layer) with TSA). Results are given in Table 7.

TABLE 7

Effect of Different Acids on the Antimicrobial Action of NaCl/Acid/SLS

| Sample | Time 0 (CFU/ml) | Time 4 Hours (CFU/ml) |
|---|---|---|
| Salt control | 850 | 1380 |
| Salt + 100 ppm SLS | 980 | 890 |
| 0.5% citric acid, 100 ppm SLS, 99.5% NaCl | 1230 | 18 |
| 0.9% succinic acid, 100 ppm SLS, 99.1% NaCl | 1070 | 69 |
| 1.5% isoascorbic acid, 100 ppm SLS, 98.5% NaCl | 1140 | 59 |
| 1.8% adipic acid, 100 ppm SLS, 98.2% NaCl | 900 | 4 |
| 1.6% sorbic acid, 100 ppm SLS, 98.4% NaCl | 820 | 500 |
| 1.3% acetic acid, 100 ppm SLS, 98.7% NaCl | 1070 | 230 |
| 2.1% propionic acid, 100 ppm SLS, 97.9% NaCl | 1440 | 6 |
| 0.6% lactic acid, 100 ppm SLS, 99.4% NaCl | 1050 | 220 |
| 1.6% ascorbic acid, 100 ppm SLS, 98.4% NaCl | 1230 | 54 |
| 0.3% formic acid, 100 ppm SLS, 99.7% NaCl | 1930 | 38 |
| 0.3% phosphoric acid, 100 ppm SLS, 99.7% NaCl | 1050 | 17 |
| 0.1% hydrochloric acid, 100 ppm SLS, 99.9% NaCl | 1100 | 44 |
| 0.3% tartaric acid, 100 ppm SLS, 99.7% NaCl | 1180 | 410 |
| 1.1% glutaric acid, 100 ppm SLS, 98.9% NaCl | 610 | 180 |
| 1.2% benzoic acid, 100 ppm SLS, 98.8% NaCl | 1020 | 17 |
| 0.5% salicylic acid, 100 ppm SLS, 99.5% NaCl | 1100 | 5 |
| 0.2% sulfuric acid, 100 ppm SLS, 99.8% NaCl | 830 | 0 |

In another experiment, test solutions containing 17% by weight of formulas containing 99.7% sodium chloride, 0.3% citric acid, and 500 ppm of various types of surfactants were tested for effectiveness in killing L. monocytogenes at cold temperatures. The same test procedure was used as described above (test solutions were plated on MOX TAL (Modified Oxford Medium with a Thin Agar Layer) with TSA). Results are given in Table 8.

TABLE 8

Effect of Different Acids on the Antimicrobial Action of NaCl/Acid/SLS

| Surfactant Tested | Time 0 (CFU/ml) | Time 4 Hours (CFU/ml) |
|---|---|---|
| Salt Control (no additive) | 880 | 610 |
| polyoxyethylene-polyoxypropylene block polymer | 820 | 610 |
| sodium salt of sulfonated oleic acid | 240 | 0 |
| sodium xylene sulfonate | 910 | 820 |
| dodecyl diphenyl oxide disulfonate | 0 | 0 |
| sodium linear alkylbenzene sulfonate | 490 | 0 |
| alpha-olefin sulfonate | 370 | 0 |
| alkylpolyglucoside | 280 | 0 |

TABLE 8-continued

Effect of Different Acids on the Antimicrobial Action of NaCl/Acid/SLS

| Surfactant Tested | Time 0 (CFU/ml) | Time 4 Hours (CFU/ml) |
|---|---|---|
| nonylphenol ethoxylate | 460 | 0 |
| fatty alkanolamide | 470 | 0 |
| alcohol ethoxylate | 1080 | 1 |
| lauramine oxide | 2 | 0 |

As presently under development, especially preferred embodiments of the antimicrobial formulations can be operated under two sets of conditions. In one, a chilling brine is maintained at a temperature of about −3.9° C. is employed. The chilling brine comprises between about 0.3% and about 1.0% citric acid. The citric acid concentration may be increased to as high as about 2.0%. Between about 100 and about 500 ppm SLS is utilized. The balance of the brine formulation is NaCl, and the formulation is mixed with water to a solution of about 9% to about 12%. In another chilling brine application, a chilling brine is maintained at a temperature of about −6.7° C. The chilling brine comprises between about 0.3% and about 1.0% citric acid. Again, the citric acid concentration may be increased to as high as about 2.0%. Between about 100 and about 500 ppm SLS is utilized. The balance of the brine formulation is NaCl, and the formulation is mixed with water to a solution of about 15% to about 17%.

Further, in other embodiments of the present invention, the ratio by weight of inorganic salt to surfactant may be greater than 29:1, greater than 1880:1, or greater than 1980:1.

Thus, the data indicate that solutions of salt, acid, and surfactant provide efficient kill of bacteria even at temperatures below the freezing point of water. Salts such as sodium sulfate, sodium chloride, and magnesium sulfate act synergistically with the acid and surfactant to enhance the antimicrobial effectiveness. The formulations are shown to be effective in killing pathogenic bacteria such as L. monocytogenes. The formulas were shown to be effective both in freshly prepared brines and in actual spent process chill brine from a ready-to-eat meat plant. The levels of acid and surfactant may be varied to suit the particular application; reducing the concentration of the acid may be compensated by raising the concentration of surfactant and vice versa. In addition to effectively killing bacteria suspended in solutions, the formulas are also shown to be effective at killing bacteria within a biofilm.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An antimicrobial formulation for use in solution comprising, in combination:
   between about 25 ppm and about 25,000 ppm by weight surfactant selected from the group consisting of sodium lauryl sulfate, linear alkylbenzene sulfonates, alcohol sulfates, alpha-olefin sulfonates, alcohol ethoxylates, nonylphenyl ethoxylates, alkylpolyglucosides, fatty alkanoamides, fatty amine oxides, sodium dioctylsulfosuccinate, dodecylbenzene sulfonic acid and salts thereof, the sodium salt of sulfonated oleic acid, sodium dodecylbenzene sulfonate, dodecyidiphenyloxidedisulfonic acid and salts thereof;

between about 0.1% and 25% acid selected from the group consisting of citric, malic, acetic, propionic, lactic, benzoic, ascorbic, isoascorbic, sorbic, phosphoric, hydrochloric, malic, tartaric, adipic, succinic, glutaric, salicylic, sulfuric acid and sodium bisulfate; and between about 72.5% and 99.9% inorganic salt selected from the group consisting of sodium, potassium, magnesium, calcium, iron, and ammonium salts of chloride, sulfate, nitrate, phosphate, carbonate, and hydroxide.

2. An antimicrobial salt for use in solution comprising, in combination:

between about 0.3% and about 6.0% by weight citric acid;

between about 50 and about 500 ppm by weight sodium lauryl sulfate; and between about 94% and about 99.7% by weight sodium chloride.

3. The antimicrobial salt for use in solution as claimed in claim 2, further comprising:

between about 0.3% and about 1.0% by weight citric acid;

between about 100 and about 500 ppm by weight sodium lauryl sulfate; and between about 99% and about 99.7% by weight sodium chloride.

4. A method for food processing comprising:

formulating a food product chilling solution containing a combination of an acid, a surfactant and a salt in an amount effective to kill microorganisms in the solution;

maintaining the solution at a temperature of less than about 0° C.;

and immersing a food product to be processed in the solution for a time sufficient to substantially reduce the presence of microorganisms on the food product;

the acid being selected from the group consisting of citric, malic, acetic, propionic, lactic, benzoic, ascorbic, isoascorbic, sorbic, phosphoric, hydrochloric, malic, tartaric, adipic, succinic, glutaric, salicylic, sulfuric acid and sodium bisulfate;

the surfactant being selected from the group consisting of sodium lauryl sulfate, linear alkylbenzene sulfonates, alcohol sulfates, alpha-olefin sulfonates, alcohol ethoxylates, nonylphenyl ethoxylates, alkylpolyglucosides, fatty alkanoamides, fatty amine oxides, sodium dioctylsulfosuccinate, dodecylbenzene sulfonic acid and salts thereof, the sodium salt of sulfonated oleic acid, sodium dodecylbenzene sulfonate, dodecyldiphenyloxide-disulfonic acid and salts thereof, and the salt being sodium, potassium, magnesium, calcium, iron, and ammonium salts of chloride, sulfate, nitrate, phosphate, carbonate, and hydroxide.

5. The method for food processing as described in claim 4, wherein the acid is further selected from the group consisting of citric and malic acid, the surfactant is sodium lauryl sulfate and the salt is sodium chloride.

6. The method for food processing as described in claim 5, wherein the acid is citric acid.

7. The method for food processing as described in claim 6, wherein the solution is maintained at a temperature of less than about −3.9° C.

8. The method for food processing as described in claim 6, wherein the solution is maintained at a temperature of less than about −6.7° C.

9. The method for food processing as described in claim 5, wherein the solution is maintained at a temperature of less than about −3.9° C.

10. The method for food processing as described in claim 5, wherein the solution is maintained at a temperature of less than about −6.7° C.

11. The method for food processing as described in claim 4, wherein the solution is maintained at a temperature of less than about −3.9° C.

12. The method for food processing as described in claim 4, wherein the solution is maintained at a temperature of less than about −6.7° C.

13. An antimicrobial solution comprising on a dry basis:

between about 25 ppm and about 25,000 ppm by weight surfactant;

between about 0.1% and 25% by weight acid; and between about 72.5% and 99.9% by weight inorganic salt.

14. The solution of claim 13 wherein the surfactant is selected from the group consisting of sodium lauryl sulfate, linear alkylbenzene sulfonates, alcohol sulfates, alpha-olefin sulfonates, alcohol ethoxylates, nonylphenyl ethoxylates, alkylpolyglucosides, fatty alkanoamides, fatty amine oxides, sodium dioctylsulfosuccinate, dodecylbenzene sulfonic acid and salts thereof, the sodium salt of sulfonated oleic acid, sodium dodecylbenzene sulfonate, dodecyidiphenyloxidedisulfonic acid and salts thereof.

15. The solution of claim 13 wherein the acid is selected from the group consisting of citric, malic, acetic, propionic, lactic, benzoic, ascorbic, isoascorbic, sorbic, phosphoric, hydrochloric, malic, tartaric, adipic, succinic, glutaric, salicylic, sulfuric acid and sodium bisulfate.

16. The solution of claim 13 wherein the inorganic salt is selected from the group consisting of sodium, potassium, magnesium, calcium, iron, and ammonium salts of chloride, sulfate, nitrate, phosphate, carbonate, and hydroxide.

17. The solution of claim 13 wherein:

the surfactant is selected from the group consisting of sodium lauryl sulfate, linear alkylbenzene sulfonates, alcohol sulfates, alpha-olefin sulfonates, alcohol ethoxylates, nonylphenyl ethoxylates, alkylpolyglucosides, fatty alkanoamides, fatty amine oxides, sodium dioctylsulfosuccinate, dodecylbenzene sulfonic acid and salts thereof, the sodium salt of sulfonated oleic acid, sodium dodecylbenzene sulfonate, dodecyidiphenyloxidedisulfonic acid and salts thereof;

the acid is selected from the group consisting of citric, malic, acetic, propionic, lactic, benzoic, ascorbic, isoascorbic, sorbic, phosphoric, hydrochloric, malic, tartaric, adipic, succinic, glutaric, salicylic, sulfuric acid and sodium bisulfate; and the inorganic salt is selected from the group consisting of sodium, potassium, magnesium, calcium, iron, and ammonium salts of chloride, sulfate, nitrate, phosphate, carbonate, and hydroxide.

18. The solution of claim 17 wherein the surfactant, acid and inorganic salt in combination comprise about 9% to 17% by weight of the solution.

19. A method for food processing comprising:

contacting a food product to be processed with a solution for a time sufficient to substantially reduce the presence of microorganisms in the solution or on the food product, wherein the solution is the solution of claim 18.

20. The solution of claim 17 wherein the surfactant, acid and inorganic salt in combination comprise about 15% to 17% by weight of the solution.

21. A method for food processing comprising:
contacting a food product to be processed with a solution for a time sufficient to substantially reduce the presence of microorganisms in the solution or on the food product,
wherein the solution is the solution of claim 20.

22. The solution of claim 17 wherein the surfactant, acid and inorganic salt in combination comprise about 9% to 12% by weight of the solution.

23. An antimicrobial solution comprising on a dry basis:
between about 0.3% and about 6.0% by weight citric acid;
between about 50 ppm and about 500 ppm by weight sodium lauryl sulfate; and
between about 94% and about 99.7% by weight sodium chloride.

24. The solution of claim 23, further comprising on a dry basis:
between about 0.3% and about 1.0% by weight citric acid;
between about 100 ppm and about 500 ppm by weight sodium lauryl sulfate; and
between about 99% and about 99.7% by weight sodium chloride.

25. An antimicrobial solution comprising:
a surfactant;
an acid; and
an inorganic salt,
wherein the ratio of the inorganic salt to the surfactant is greater than about 29:1 by weight.

26. The solution of claim 25 wherein the ratio of the inorganic salt to the surfactant is greater than about 1880:1 by weight.

27. The solution of claim 25 wherein the ratio of the inorganic salt to the surfactant is greater than about 1980:1 by weight.

28. The solution of claim 25 wherein:
the surfactant is selected from the group consisting of sodium lauryl sulfate, linear alkylbenzene sulfonates, alcohol sulfates, alpha-olefin sulfonates, alcohol ethoxylates, nonylphenyl ethoxylates, alkylpolyglucosides, fatty alkanoamides, fatty amine oxides, sodium dioctylsulfosuccinate, dodecylbenzene sulfonic acid and salts thereof the sodium salt of sulfonated oleic acid, sodium dodecylbenzene sulfonate, dodecyidiphenyloxidedisulfonic acid and salts thereof;
the acid is selected from the group consisting of citric, malic, acetic, propionic, lactic, benzoic, ascorbic, isoascorbic, sorbic, phosphoric, hydrochloric, malic, tartaric, adipic, succinic, glutaric, salicylic, sulfuric acid and sodium bisulfate; and
the inorganic salt is selected from the group consisting of sodium, potassium, magnesium, calcium, iron, and ammonium salts of chloride, sulfate, nitrate, phosphate, carbonate, and hydroxide.

29. The solution of claim 28 wherein the surfactant, acid and inorganic salt in combination comprise about 9% to 17% by weight of the solution.

30. The solution of claim 25 wherein:
the acid comprises citric or malic acid;
the surfactant comprises sodium lauryl sulfate; and
the inorganic salt comprises sodium chloride.

31. The solution of claim 30 wherein the surfactant, acid and inorganic salt in combination comprise about 9% to 17% by weight of the solution.

32. The antimicrobial solution of claim 30 wherein the ratio of the inorganic salt to the surfactant is greater than about 1880:1 by weight.

33. A method for food processing comprising:
contacting a food product to be processed with a chilling solution comprising a combination of an acid, surfactant and a salt for a time sufficient to substantially reduce a presence of microorganisms in the chilling solution or on the food product.

34. The method of claim 33 wherein the ratio of salt to the inorganic salt to the surfactant of the chilling solution is greater than about 29:1 by weight.

35. The method of claim 33 wherein the ratio of the inorganic salt to the surfactant of the chilling solution is greater than about 1880:1 by weight.

36. The method of claim 33, wherein the chilling solution is maintained at a temperature of less than about 0° C.

37. The method of claim 33, wherein the chilling solution is maintained at a temperature of less than about −3.9° C.

38. The method of claim 33, wherein the chilling solution is maintained at a temperature of less than about −6.7° C.

39. The method of claim 33 wherein the surfactant, acid and inorganic salt in combination comprise about 9% to 17% by weight of the chilling solution.

40. The method of claim 33 wherein:
the acid is selected from the group consisting of citric, malic, acetic, propionic, lactic, benzoic, ascorbic, isoascorbic, sorbic, phosphoric, hydrochloric, malic, tartaric, adipic, succinic, glutaric, salicylic, sulfuric acid and sodium bisulfate;
the surfactant is selected from the group consisting of sodium lauryl sulfate, linear alkylbenzene sulfonates, alcohol sulfates, alpha-olefin sulfonates, alcohol ethoxylates, nonylphenyl ethoxylates, alkylpolyglucosides, fatty alkanoamides, fatty amine oxides, sodium dioctylsulfosuccinate, dodecylbenzene sulfonic acid and salts thereof, the sodium salt of sulfonated oleic acid, sodium dodecylbenzene sulfonate, dodecyldiphenyloxide-disulfonic acid and salts thereof,
and the salt is selected form the group consisting of sodium, potassium, magnesium, calcium, iron, and ammonium salts of chloride, sulfate, nitrate, phosphate, carbonate, and hydroxide.

41. The method of claim 40 wherein the surfactant, acid and inorganic salt in combination comprise about 9% to 17% by weight of the chilling solution.

42. The method of claim 40 wherein the ratio of the inorganic salt to the surfactant of the chilling solution is greater than about 29:1 by weight.

43. The method of claim 40 wherein the ratio of the inorganic salt to the surfactant of the chilling solution is greater than about 1880:1 by weight.

44. The method of claim 40, wherein the chilling solution is maintained at a temperature of less than about 0° C.

45. The method of claim 40, wherein the chilling solution is maintained at a temperature of less than about −3.9° C.

46. The method of claim 40, wherein the chilling solution is maintained at a temperature of less than about −6.7° C.

47. The method of claim 33 wherein the acid is selected from the group consisting of citric and malic acid, the surfactant is sodium lauryl sulfate and the salt is sodium chloride.

48. The method of claim 47 wherein the surfactant, acid and inorganic salt in combination comprise about 9% to 17% by weight of the chilling solution.

49. The method of claim 47 wherein the ratio of the inorganic salt to the surfactant of the chilling solution is greater than about 29:1 by weight.

50. The method of claim 47 wherein the ratio of the inorganic salt to the surfactant of the chilling solution is greater than about 1880:1 by weight.

51. The method of claim 47, wherein the chilling solution is maintained at a temperature of less than about 0° C.

52. The method of claim 47, wherein the chilling solution is maintained at a temperature of less than about −3.9° C.

53. The method of claim 47, wherein the chilling solution is maintained at a temperature of less than about −6.7° C.

54. A method for food processing comprising:
contacting a food product to be processed with a solution for a time sufficient to substantially reduce a presence of microorganisms in the solution or on the food product,
wherein the solution comprises on a dry basis between about 25 ppm and about 25,000 ppm by weight surfactant, between about 0.1% and 25% by weight acid, and between about 72.5% and 99.9% by weight inorganic salt.

55. The method of claim 54 wherein the surfactant, acid and inorganic salt in combination comprise about 9% to 17% by weight of the solution.

56. The method of claim 54 further comprising the step of maintaining the solution at a temperature of less than about 0° C.

57. The method of claim 54, wherein the solution is maintained at a temperature of less than about −3.9° C.

58. The method of claim 54, wherein the solution is maintained at a temperature of less than about −6.7° C.

59. The method of claim 54 wherein the surfactant is selected from the group consisting of sodium lauryl sulfate, linear alkylbenzene sulfonates, alcohol sulfates, alpha-olefin sulfonates, alcohol ethoxylates, nonylphenyl ethoxylates, alkylpolyglucosides, fatty alkanoamides, fatty amine oxides, sodium dioctylsulfosuccinate, dodecylbenzene sulfonic acid and salts thereof, the sodium salt of sulfonated oleic acid, sodium dodecylbenzene sulfonate, dodecyidiphenyloxidedisulfonic acid and salts thereof;
the acid is selected from the group consisting of citric, malic, acetic, propionic, lactic, benzoic, ascorbic, isoascorbic, sorbic, phosphoric, hydrochloric, malic, tartaric, adipic, succinic, glutaric, salicylic, sulfuric acid and sodium bisulfate; and
the inorganic salt is selected from the group consisting of sodium, potassium, magnesium, calcium, iron, and ammonium salts of chloride, sulfate, nitrate, phosphate, carbonate, and hydroxide.

60. The method of claim 59 wherein the surfactant, acid and inorganic salt in combination comprise about 9% to 17% by weight of the solution.

61. The method of claim 59 further comprising the step of maintaining the solution at a temperature of less than about 0° C.

62. The method of claim 59, wherein the solution is maintained at a temperature of less than about −3.9° C.

63. The method of claim 59, wherein the solution is maintained at a temperature of less than about −6.7° C.

64. The method of claim 54 wherein the acid is selected from the group consisting of citric and malic acid, the surfactant is sodium lauryl sulfate and the salt is sodium chloride.

65. The method of claim 64 wherein the surfactant, acid and inorganic salt in combination comprise about 9% to 17% by weight of the solution.

66. The method of claim 64, wherein the solution is maintained at a temperature of less than about 0° C.

67. The method of claim 64, wherein the solution is maintained at a temperature of less than about −3.9° C.

68. The method of claim 64, wherein the solution is maintained at a temperature of less than about −6.7° C.

69. A method for food processing comprising:
contacting a food product to be processed with a solution for a time sufficient to substantially reduce a presence of microorganisms in the solution or on the food product,
wherein the solution comprises a surfactant, an acid, and an inorganic salt, and
wherein the ratio of the inorganic salt to the surfactant of the solution is greater than about 29:1 by weight.

70. The method of claim 69 wherein the surfactant, acid and inorganic salt in combination comprise about 9% to 17% by weight of the solution.

71. The method of claim 69 wherein the ratio of the inorganic salt to the surfactant of the solution is greater than about 1880:1 by weight.

72. The method of claim 69 wherein the surfactant is selected from the group consisting of sodium lauryl sulfate, linear alkylbenzene sulfonates, alcohol sulfates, alpha-olefin sulfonates, alcohol ethoxylates, nonylphenyl ethoxylates, alkylpolyglucosides, fatty alkanoamides, fatty amine oxides, sodium dioctylsulfosuccinate, dodecylbenzene sulfonic acid and salts thereof, the sodium salt of sulfonated oleic acid, sodium dodecylbenzene sulfonate, dodecyidiphenyloxidedisulfonic acid and salts thereof;
the acid is selected from the group consisting of citric, malic, acetic, propionic, lactic, benzoic, ascorbic, isoascorbic, sorbic, phosphoric, hydrochloric, malic, tartaric, adipic, succinic, glutaric, salicylic, sulfuric acid and sodium bisulfate; and
the inorganic salt is selected from the group consisting of sodium, potassium, magnesium, calcium, iron, and ammonium salts of chloride, sulfate, nitrate, phosphate, carbonate, and hydroxide.

73. The method of claim 72 wherein the surfactant, acid and inorganic salt in combination comprise about 9% to 17% by weight of the solution.

74. The method of claim 72 wherein the ratio of the inorganic salt to the surfactant of the solution is greater than about 1880:1 by weight.

75. The method of claim 69 wherein the acid is selected from the group consisting of citric and malic acid, the surfactant is sodium lauryl sulfate and the salt is sodium chloride.

76. The method of claim 75 wherein the surfactant, acid and inorganic salt in combination comprise about 9% to 17% by weight of the solution.

77. The method of claim 75 wherein the ratio of the inorganic salt to the surfactant of the solution is greater than about 1880:1 by weight.

* * * * *